US008555014B1

(12) United States Patent
Pedone, Jr. et al.

(10) Patent No.: US 8,555,014 B1
(45) Date of Patent: Oct. 8, 2013

(54) AUTOMATIC ACCESS MANAGEMENT OF CLIENTS TO A STORAGE SYSTEM

(75) Inventors: James M. Pedone, Jr., West Boylston, MA (US); Sorin Faibish, Newton, MA (US); Xiaoye Jiang, Shrewsbury, MA (US); Per Brashers, Oakland, CA (US); Jason R. Glasgow, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 734 days.

(21) Appl. No.: 12/005,640

(22) Filed: Dec. 27, 2007

(51) Int. Cl.
*G06F 12/00* (2006.01)

(52) U.S. Cl.
USPC ........... 711/163; 711/147; 711/154; 711/164; 711/167; 711/170

(58) Field of Classification Search
USPC .......................... 711/147, 154, 163, 167, 170
See application file for complete search history.

(56) References Cited

U.S. PATENT DOCUMENTS

| 6,578,033 B1 * | 6/2003 | Singhal et al. ........................ 1/1 |
| 2003/0212752 A1 * | 11/2003 | Thunquest et al. ........... 709/213 |
| 2005/0091403 A1 * | 4/2005 | Falcon et al. .................. 709/245 |
| 2005/0108231 A1 * | 5/2005 | Findleton et al. .................. 707/8 |
| 2005/0176408 A1 * | 8/2005 | Stein .............................. 455/411 |
| 2006/0248127 A1 * | 11/2006 | Whitehouse .................. 707/203 |

OTHER PUBLICATIONS

"EMC CLARiiON Best Practices for Fibre Channel Storage," Engineering White Paper, EMC Corporation, Mar. 16, 2004, 36 pp.
"EMC CLARiiON CX3 Best Practices for Achieving 'Five 9s' Availability," Best Practices Planning White Paper, EMC Corporaton, Feb. 2007, 14 pp.

* cited by examiner

*Primary Examiner* — Reginald Bragdon
*Assistant Examiner* — Gurtej Bansal (57) ABSTRACT

Embodiments of the present invention provide a method of managing access of multiple client computers to a storage system that supports a limited number of logins. The method comprises, in response to a request to enable a subset of the clients to access resources of the storage system to perform a task, automatically configuring the storage system to provide the subset of the clients access to the resources, and, when the task is completed, automatically re-configuring the storage system so that the subset of the clients is no longer provided with access to the resources of the storage system.

20 Claims, 7 Drawing Sheets

AUTOMATIC ACCESS MANAGEMENT OF CLIENTS TO A STORAGE SYSTEM

BACKGROUND OF INVENTION

Computer storage systems provide storage services to one or more host computers. Computer storage systems can take any of numerous forms, and typically include one or more storage media on which data is stored and other components (e.g., controllers) that manage access to the storage media. Computer storage systems can be employed for any of numerous purposes. For example, storage systems may allow otherwise disparate data to be consolidated into a data center that can be accessed by multiple host computers simultaneously. Host computers of any suitable type (e.g., database servers, web servers, other types of application servers, user computers, etc.) may access the storage systems to perform various tasks requiring access to the resources of the storage system. The term host computer and client computer are used interchangeably throughout this application. An example of a storage system is a CLARiiON® storage array designed and manufactured by EMC® Corporation.

SUMMARY OF INVENTION

In one embodiment, there is provided a method for use in a computer system comprising a plurality of client computers and at least one storage system. The method comprises an act of, in response to at least one request to enable a subset of the plurality of clients to access at least one resource of the at least one storage system to perform a task, automatically configuring the at least one storage system to provide the subset of the plurality of clients access to the at least one resource. The method further comprises an act of, when the task is completed, automatically re-configuring the storage system so that at least one of the subset of the plurality of clients is no longer provided with access to the at least one resource.

In another embodiment, there is provided at least one computer readable medium encoded with a plurality of instructions that, when executed, perform a method for use in a computer system comprising a plurality of client computers and at least one storage system. The method comprises an act of, in response to at least one request to enable a subset of the plurality of clients to access at least one resource of the at least one storage system to perform a task, automatically configuring the at least one storage system to provide the subset of the plurality of clients access to the at least one resource. The method further comprises an act of, when the task is completed, automatically re-configuring the storage system so that at least one of the subset of the plurality of clients is no longer provided with access to the at least one resource.

In a further embodiment, there is provided a device for use in a computer system comprising a plurality of client computers and at least one storage system. The device comprises at least one processor programmed to implement a method comprising an act of, in response to at least one request to enable a subset of the plurality of clients to access at least one resource of the at least one storage system to perform a task, automatically configuring the at least one storage system to provide the subset of the plurality of clients access to the at least one resource and an act of, when the task is completed, automatically re-configuring the storage system so that at least one of the subset of the plurality of clients is no longer provided with access to the at least one resource.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Applicants have appreciated that some storage systems impose a limit on the number of host computers which can simultaneously access the storage system to utilize its resources. In this respect, host computers physically connected to a storage system may be in one of several states. For example, a host computer may be physically connected to a storage system (via a storage area network (SAN) or otherwise) but may not be logged in to the storage system so that the storage system is essentially unaware of the existence of the host computer. To make itself visible to the storage system, a host computer can log in to the storage system. In some storage systems that provide no access control capability, a host that logs in to a storage system may have access to all of the storage resources of the storage system. The storage resources can include, for example, volumes of storage (e.g., logical unit numbers or LUNs) or other types of resources. However, some storage systems (including a CLARiiON® storage array) provide an access controller that can control access requests from host computers to the storage system resources. The access controller can configure the storage system in any of numerous ways, including configuring some host computers to have limited access to only a subset of the storage system resources. Some storage systems may also have the capability to configure a host computer for access to storage resources within the storage system even before it has been logged in. The CLARiiON® storage array limits the number of host computers that may be "visible" to the storage system at any particular time to one hundred twenty-eight (128). The total number of visible hosts includes a total number of host computers that are logged in or have at least one resource (e.g., a LUN) configured or allocated to it. Thus, with a CLARiiON® storage array, hosts that are physically connected to it but have never been logged into the storage system and have never had a resource configured for it are not included in the limit on the number of visible hosts. Similarly, hosts that are physically connected and may have been (but are not currently) previously logged in and have never been configured for access to one or more resources (e.g., LUNs) are not included in the number of "visible" devices for which a limit is imposed. It should be appreciated that the aspects of the present invention described herein are not limited to storage systems that impose a limit on "visible" client computers in any particular way, and can include limits on devices that are logged in and/or configured for access in any desired way, as well as considering any other suitable criteria. It should be appreciated that the aspects of the present invention described herein are not limited to use with a storage system that defines whether a host computer is visible to the storage system in precisely the same way as the CLARiiON® storage array or in any other particular manner. In this respect, some embodiments of the present invention described below can be used advantageously with storage systems that impose some limit on the number of host computers that can access the storage system at any particular time, and the techniques described herein can be employed with any storage system of this type, irrespective of the number of host computers included in the limit or the manner in which the storage system determines whether a particular host computer counts toward that limit or not.

For many computer system configurations, such a limit imposed by the storage system does not impose significant restrictions on the desired system configuration and operation. However, Applicants have appreciated that in some circumstances, it may be desirable to enable a number of host computers greater than the limit imposed by the storage system to share one or more resources of the storage system (e.g., one or more storage volumes). An example of such a configuration described below specifically relates to a grid computing system wherein a large number of host computers share access to data stored on a storage system via both a network attached storage (NAS) file system interface and a block Input/Output (I/O) or storage area network (SAN) interface. However, it should be appreciated that the aspects of the present invention described herein that enable a number of host computers exceeding a limit imposed by the storage system to share access to the storage system is not limited to use in a grid computing environment or an environment in which the storage system is accessible via a NAS and/or block I/O interface. It should be appreciated that the example described in detail herein is merely illustrative, as the techniques described herein can be used in connection with numerous other computer configurations in which a large number of hosts seek access to a storage system.

Applicants have appreciated that in some computer configurations (e.g., a grid configuration), a large number of client computers that may require access to a storage system need not all require that access simultaneously. Thus, in accordance with one embodiment of the present invention, the storage system is automatically and dynamically configured and re-configured to provide temporary access to a subset of the large number of client computers at any particular time (e.g., by logging host computers in and/or configuring an access controller on the storage system to provide access to one or more desired resources for hosts). In one embodiment, this can be accomplished on a task basis, so that access is provided to one or more of the host computers to perform one or more desired tasks, but then when the task(s) are completed, the storage system may be automatically re-configured so that the host computer(s) are no longer provided with access to the resource (e.g., by making a host no longer "visible" to the storage system). In this way, the limited number of "visibility slots" that a storage system may have available can be dynamically shifted over time among a large number of client computers so that the storage system can effectively service a larger number of client computers than it has available visibility slots. This can be done in any suitable way, examples of which are described below.

As should be appreciated from the foregoing, some embodiments of the invention provide techniques for use in a computer system comprising a plurality of client computers and at least one storage system. In response to at least one request to enable a subset of the plurality of clients to access at least one resource of the at least one storage system to perform a task, the at least one storage system is automatically configured to provide the subset of the plurality of clients access to the at least one resource. When the task is completed, the storage system may be automatically re-configured so that at least one of the subset of the plurality of clients is no longer provided with access to the at least one resource.

While some embodiment of the present invention configure the storage system to provide access for a host computer to the storage system to enable the host compute to complete a task and then re-configure to remove that access at the completion of the task, it should be appreciated that all aspects of the present invention are not limited to performing the dynamic configuring and re-configuring of the storage system on a task basis, as other techniques can be employed for allowing a plurality of host computers to share access to a storage system (e.g., the storage system could be configured for access by host computers and re-configured for no access by the host computers based upon temporal considerations that can allow for shared access).

It should be appreciated that the storage system can be configured and re-configured to provide or remove access for one or more host computers using any suitable technique, as the aspects of the present invention described herein are not limited in this respect. As discussed below, in accordance with one embodiment of the present invention for use in a computer configuration in which a NAS server provides a file system interface for the storage system, the configuring and re-configuring of the storage system may be performed using the capabilities of the NAS server, to leverage capabilities already provided by conventional NAS servers to enable the configuration of a storage system. However, it should be appreciated that the embodiments of the present invention that relate to use in computer configurations including a NAS server are not limited in this respect, and that other techniques can be employed to configure and re-configure the storage system either directly or via another system component, rather than through the NAS server. In addition, as also stated above, the embodiments of the present invention described herein are not limited to use in computer configurations that even employ a NAS server, so that other techniques can be employed for configured and re-configuring a storage system.

Figure 1:
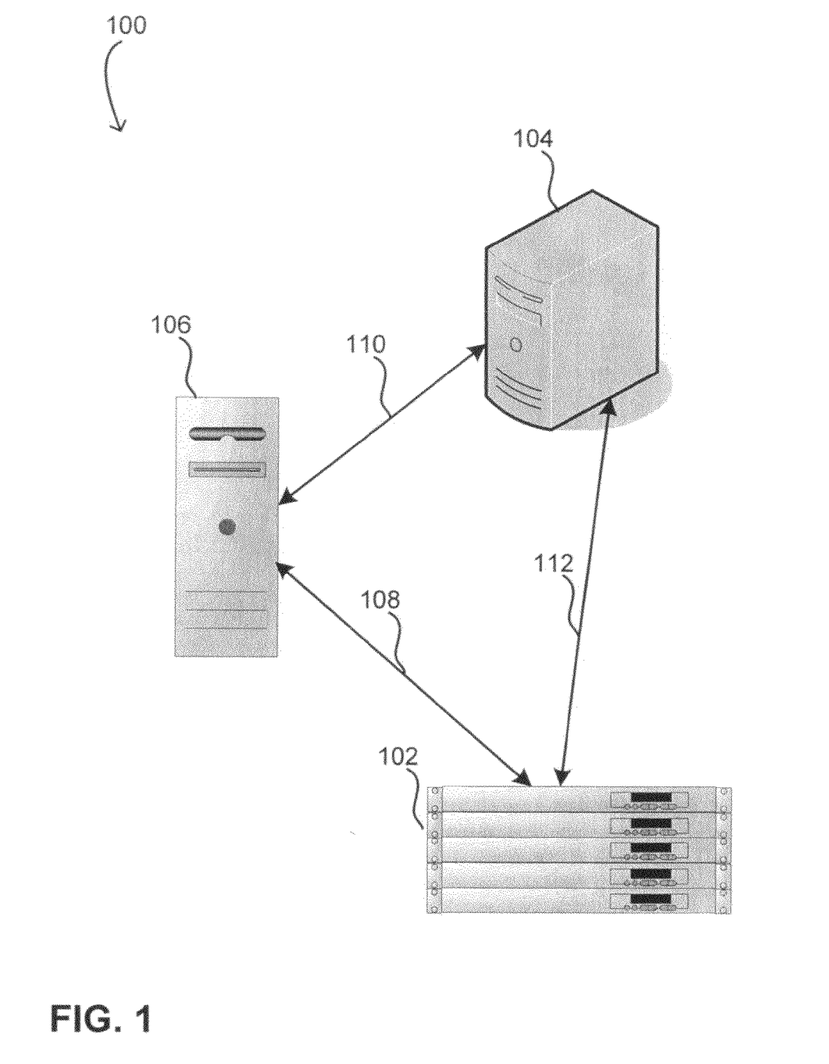
FIG. 1 is a schematic diagram of a system in which embodiments of the present invention may be implemented.

FIG. 1 shows a schematic diagram of a system 100 in which embodiments of the invention may be implemented. System 100 comprises a client 104 that accesses a storage system 102 via a NAS server 106 and connections 110 and 108. For purposes of simplicity, only a single client computer 104, a single storage system 102 and a single NAS server 106 are shown. However, it should be appreciated that the embodiments of the present invention described herein are not limited to a configuration including a single one of any of these system components, and can be used in computer system configurations wherein multiple components of any of these types are employed. The client computer(s) 104 can execute any of numerous types of application program and store any suitable type of data on the storage system(s) 102, as the aspects of the present invention are not limited to computer configurations wherein any specific type of application program is executing on the client computer(s) 104.

The connection 110 between the client computer(s) 104 and the NAS server(s) 106 can be accomplished in any suitable manner (e.g., via the NFS or CIFs protocols) and can include a single dedicated connection, multiple parallel connections a network connection, etc., as the aspects of the present invention described herein are not limited in this respect. Similarly, the connection 108 between the NAS server(s) 106 and the storage system(s) 102 can take any suitable form.

It should be appreciated that the NAS server 106 provides a file system interface for the storage system 102, which can allow shared access to the data stored thereon by two or more client computer(s) 104. In the configuration shown in FIG. 1, a storage area network (SAN) connection 112 may also be provided between the client computer(s) 104 and the storage system 102 to provide a direct path (i.e., one that doesn't pass through the NAS file server 106) for the transfer of data therebetween. Thus, the storage system may be configured to enable some I/O requests from the client computer(s) 104 to pass through the CAS file server 106 (e.g., via the connections 108, 100), whereas other I/O requests may pass directly over the connection 112. The connection 112 can take any suitable form, including a Fiber Channel connection, an iSCSI connection or any other suitable connection. As with the connections 108 and 110, although only a single line is shown for connection 112, it should be appreciated that a single or multiple parallel path(s) may be employed. For direct accesses between the client computer(s) 104 and the storage system(s) 112, the file server 106 may serve as a metadata server, providing the client computers with metadata that specifies where a desired file is stored on the storage system(s) 102, so that the client computer(s) 104 can provide that metadata directly to the storage systems 102 to access the underlying data for a file. In such a configuration, the NAS server 106 may authenticate each of the client computer(s) 104 so that the environment is trusted, and each of the client computer(s) 104 can share access to all of the data on the storage system(s) 102.

An example of a commercial product that allows for direct client computer access to the storage system(s) in a NAS environment is the Celerra® Multi-Path File System (MPFS) available from EMC Corporation. However, it should be appreciated that the aspects of the present invention described herein are not limited to use with a Celerra® MPFS configuration, or even to any configuration wherein multiple client computers that access one or more storage systems also do so via a NAS interface.

Figure 2:
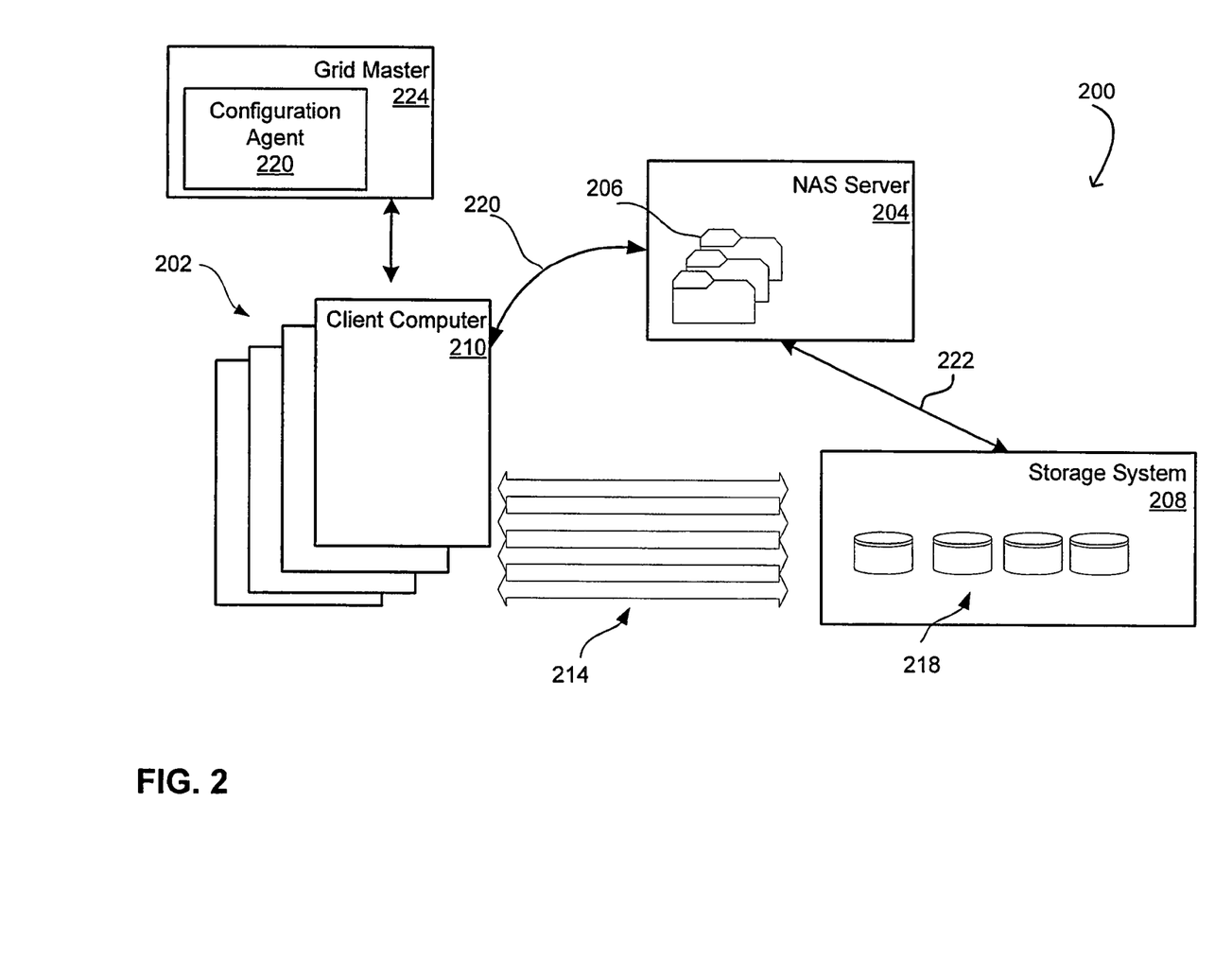
FIG. 2 is a detailed schematic diagram of a grid computing system in which embodiments of the present invention may be implemented.

FIG. 2 illustrates a grid computing system on which aspects of the present invention may be implemented, and includes a storage system that is accessible to a plurality of client computers via both a NAS server and a direct storage area network (SAN) path in a manner similar to the configuration of FIG. 1. In FIG. 2, multiple clients 202 share access to information stored on a storage system 208 via a file system interface presented by a NAS server 204, or directly (e.g., via a SAN interface) in much the same manner as the system disclosed in FIG. 1. Although only a single NAS server 204 and a single storage system 208 are shown in FIG. 2, it should be appreciated that the system may include multiple NAS servers and/or multiple storage systems 208. The NAS server 204 may be implemented using the Celerra® MPFS as discussed above in connection with FIG. 1, although it should be appreciated that the present invention is not limited in this respect and can be employed with NAS systems of other types.

The computer system 200 of FIG. 2 further includes a grid master (also referred to as a controller) 224 that manages the performance of the grid computing system. In this respect, it should be appreciated that a grid computing system can provide a number of distinct nodes or resources that the grid master 224 can select from to perform a task assigned to the grid computing system 200. For example, the grid computing system may be asked to perform a task that requires the processing of data stored on the storage system 208. The grid master 224 may select a specific number of client computers 210 to perform the data processing operations collectively (e.g., in parallel), and may select specific ones of the client computers 210 that are available to perform the task. The grid master 224 may then kick off a task by causing the selected client computers to perform the requested data processing operations, and during the performance of the task, those client computers may access the data stored on the storage system 208 in parallel. In the configuration shown in FIG. 2, the data stored on the storage system 208 may be shared by all of the client computers selected to perform a task.

It should be appreciated that it is often desirable to provide grid computing environments with a large number of resources such as the client computers 210 that perform data processing operations. For example, some grid computing environments may desire to have on the order of 1,000 or more client computers. Conventionally, it may not be possible to implement such a grid computing environment if the number of client computers 210 exceeds the number of visibility slots supported by the storage system 208. In this respect, using a conventional technique, as it may be necessary for each of the client computers 210 to share access to all of the data on the storage system 208, all of the client computers in the grid computing system needed to be configured simultaneously for access to the storage system 208, such that the number of visibility slots available for the storage system could become a gating factor on the number of client computers that could be employed in the grid computing system.

As discussed above, in accordance with one embodiment of the present invention, the techniques described herein can be employed to dynamically configure and re-configure a number of client computers for access to a storage system, so that a large number of client computers can share access to the data stored on the data storage system, but wherein only a subset of the larger number of client computers may be configured to consume one of the storage system's visibility slots at any particular point in time. While not limited to such an application, the grid computing system 200 of the type shown in FIG. 2 is one application for the embodiments of the present invention described herein. For example, using the techniques described herein, a grid computing environment can be formed with a large number of client computers that exceeds the number of visibility slots provided by the storage system 208. Nevertheless, by dynamically configuring and re-configuring different ones of the plurality of client computers 210 at different times to perform tasks scheduled by the grid master 224, it is possible for all of the client computers 210 in the grid configuration to share access to all of the data stored on the storage system 208, but wherein at any particular time, the number of client computers employed to perform one or more tasks requiring access to the storage system 208 can be restricted to a number that does not exceed the number of visibility slots available from the storage system 208.

Figure 3:
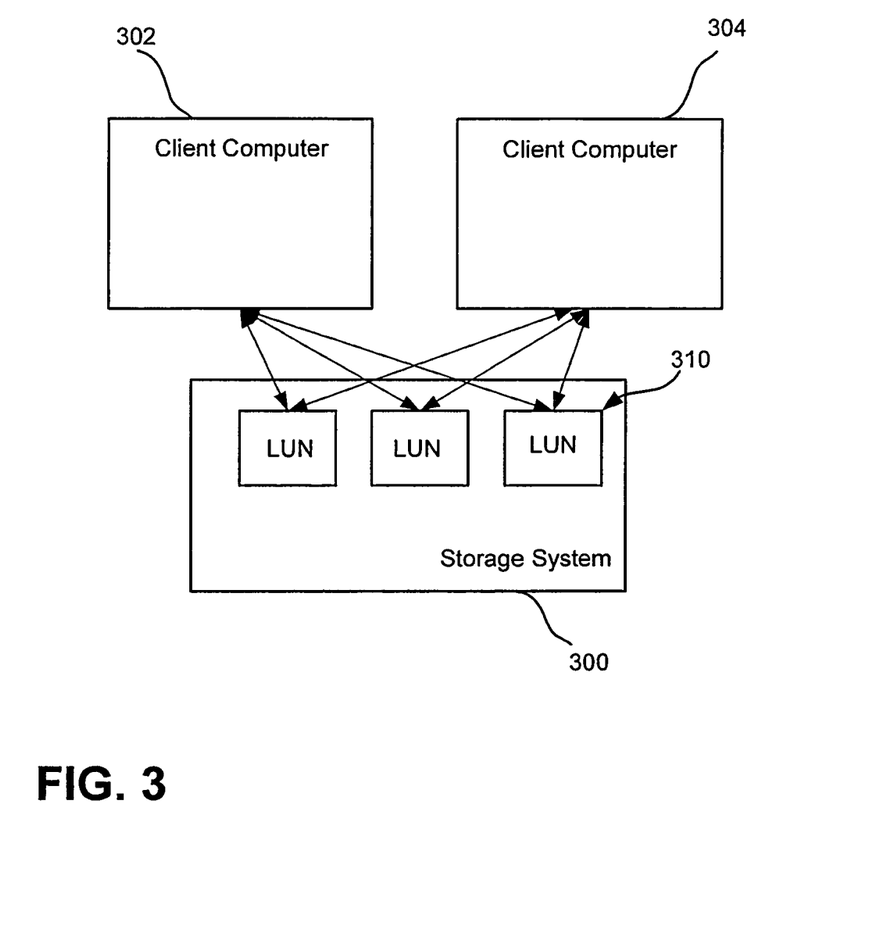
FIGS. 3-4 are schematic diagrams illustrating systems in which multiple host computers that access shared resources of a storage system, and in which embodiments of the invention may be implemented.

Thus, in accordance with one embodiment of the present invention, techniques can be employed to enable a plurality of client computers to share one or more resources of a storage system despite the fact that the number of client computers may exceed a limit imposed by a storage system on the number of client computers that may be visible to it at any particular time. In one specific example described herein, a resource that may be shared among a plurality of client computers is one or more LUNs made available by a storage system. This is shown conceptually in FIG. 3, wherein a plurality of client computers 302-304 share access to a plurality of LUNs 310 stored on a storage system 300. It will be appreciated by those of skill in the art that a LUN is simply a logical unit of storage that may correspond directly to one or more physical storage devices, may be stored on only a portion of a physical storage device, or may be distributed among multiple physical storage devices (e.g., disk drives or some other storage device). In the example described above in FIGS. 1 and 2 wherein the client computers access the storage system both via NAS and SAN interfaces, it may be desirable to provide visibility for each of the client computers 302-304 to each of the LUNs 310, as the NAS interface enables the sharing of files presented thereby among the client computers, so that enabling access for each client computer to the full set of files presented by the NAS interface may be facilitated by providing access to all of the LUNs 310. However, it should be appreciated that the aspects of the present invention described herein are not limited in this respect, and that the client computers can share access to only a subset of the LUNs provided by a storage system. In addition, it should be appreciated that a LUN is merely one example of a resource that may be shared by multiple client computers using the techniques described herein, as that the aspects of the present invention described herein are not limited in this respect, and can be used to share access to other types of resources made available via a storage system 300. It should also be appreciated that while there are only two client computers 302-304 shown in FIG. 3, the aspects of the present invention described herein can be used in computer configurations including any number of client computers (e.g., 2, 100, 1000, etc.). In addition, it should be appreciated that FIG. 3 is intended to illustrate conceptually that the client computers share access to one or more resources on the storage system 300, and is not meant to demonstrate that they only do so by a direct connection to the storage system 300, as numerous other configurations are possible, including the exemplary configurations shown in FIGS. 1 and 2 and many others.

As discussed above, the aspects of the present invention described herein can be employed with any type of storage system, as the present invention is not limited in this respect. In accordance with one embodiment of the present invention, the techniques described herein can be employed with a CLARiiON® storage array available from EMC Corporation. In the CLARiiON® storage array, LUNs are made available over the ports of the storage system via two storage processors. These are shown conceptually in FIG. 4 as storage processor 402 (also referred to as storage processor A or SPA) and storage processor 404 (also referred to as storage processor B or SPB). In some configurations, the storage processors each control access to half of the LUNs in the storage system 400. For example, in the illustrative configuration shown in FIG. 4, SPA 402 provides access to the even numbered LUNs 410, and SPB 404 provides access to the odd numbered LUNs 412. It should be appreciated that this distribution of LUNs among the storage processors is merely illustrative, as other configurations are possible.

Figure 4:
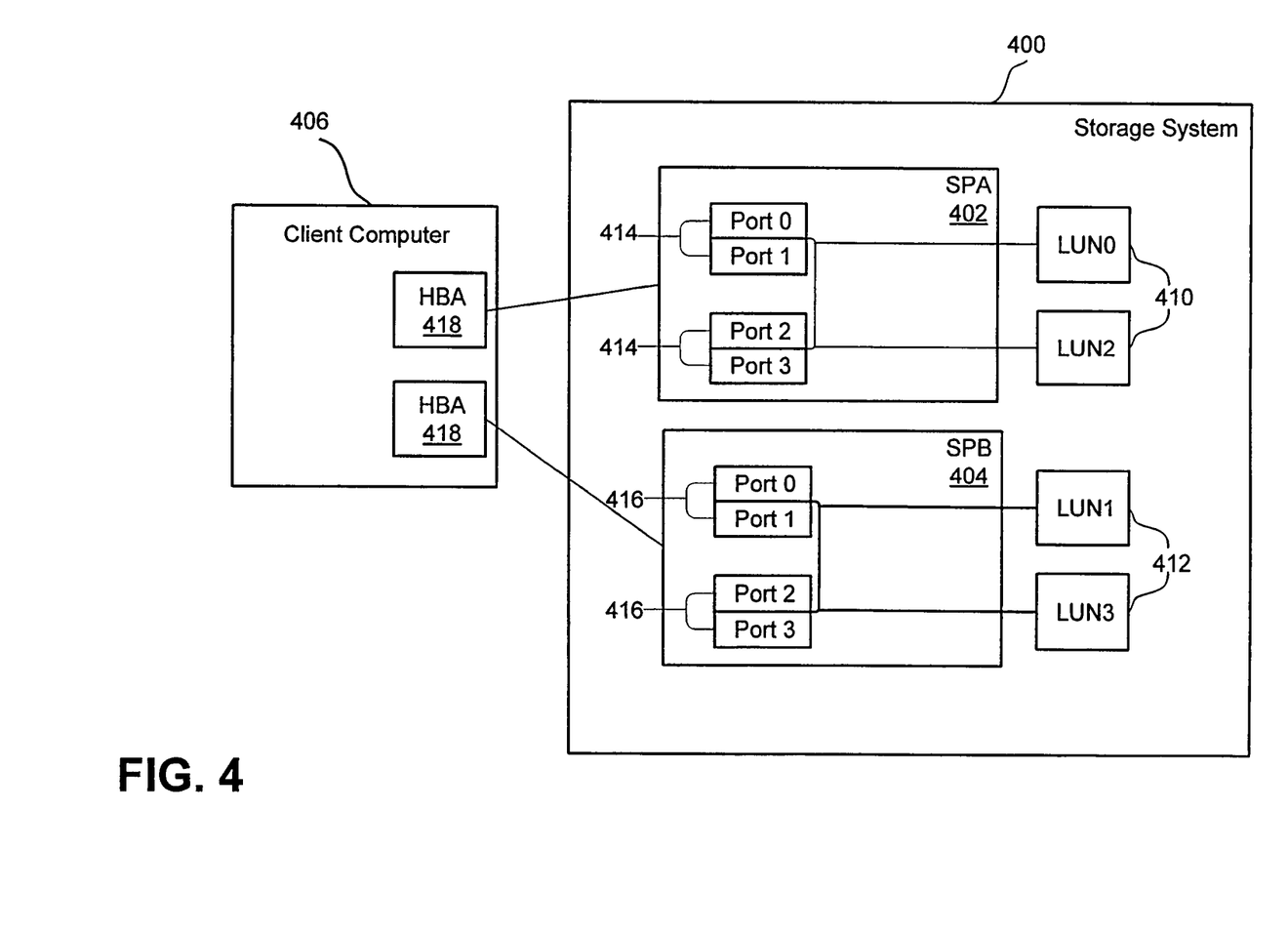

Although there are numerous configurations of a CLARiiON® storage array that are possible, one illustrative configuration for use with the iSCSI protocol has four ports provided per storage processor. This is illustrated in FIG. 4, wherein SPA 402 includes four ports 414 (also referred to as ports 0-3) and SPB 404 includes four ports 416 (also referred to as ports 0-3). Thus, each of the LUNs to which a storage processor manages access can be accessed by a client computer via any of the ports of the corresponding storage processor.

As discussed above, a CLARiiON® storage array also is provided with an access controller (not shown) that controls access to the LUNs provided on the storage system via client computers that log in to the storage system. The aspects of the present invention described herein are not limited to being employed with a storage system that includes such an access controller, and in the absence of one, any host computer that logs in to a port of the storage system may be provided with access to all of the LUNs accessible via that port. However, for a storage system that includes an access controller, a client computer typically is authenticated by the access controller and the access controller then configures the storage system to provide the client computer with access to the appropriate LUNs on the storage system. In some configurations, the access controller may provide each client computer with access to only a limited number of the LUNs. However, as discussed above, in accordance with one illustrative embodiment of the invention wherein the storage system is also accessible to the client computers via a NAS interface, it may be desirable to provide each of the client computers with access to all of the LUNs on the storage system, as the NAS interface may enable all of the data on the storage system to be shared among all of the client computers.

As shown in FIG. 4, a client computer 406 may include one or more host bus adaptors (HBAs) 418 via which the client computer may log in to any of the ports of the storage system. However, the aspects of the present invention are not limited in this respect.

Figure 5:
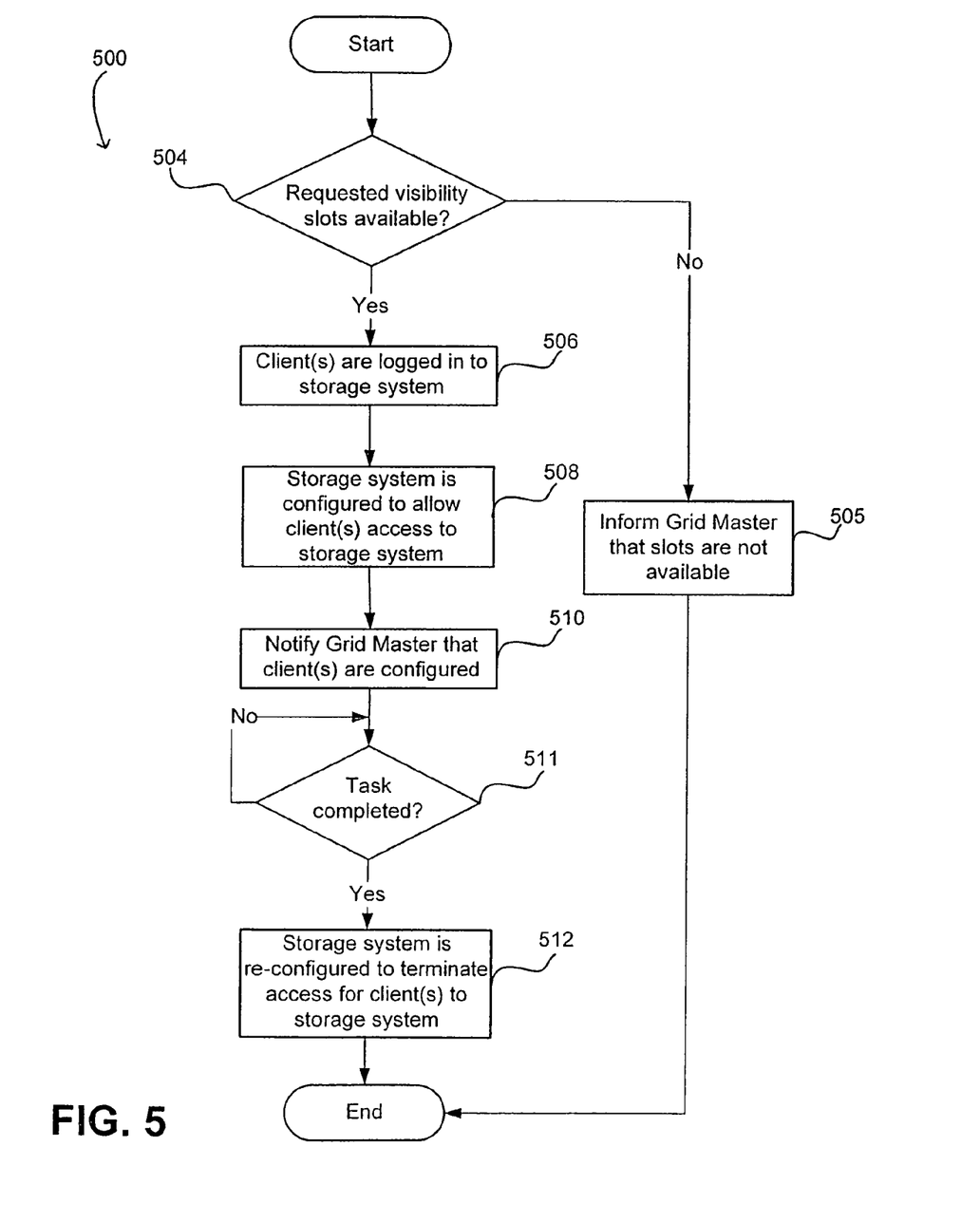
FIG. 5 is a flowchart of an illustrative process of configuring and re-configuring a storage system according to some embodiments of the invention.

As discussed above, in accordance with some embodiments of the present invention, techniques are employed to dynamically configure a storage system to provide access to one or more client computers for a limited period of time or until a task is performed, and at the conclusion of that time or task, the storage system is re-configured to remove the access that was temporarily granted to one or more of those client computers to ensure that they do not consume one of the storage system's visibility slots when they are not actively accessing data on the storage system. This can be accomplished in any suitable manner, as the aspects of the present invention described herein are not limited to any particular implementation technique. One illustrative process for performing this dynamic configuration and re-configuration of a storage system is illustrated in FIG. 5. However, it should be appreciated that numerous other processes are possible, including processes that perform the listed acts in different orders or concurrently, and processes that perform different, additional or fewer acts.

The process at FIG. 5 can be initiated in any suitable manner. For example, in accordance with the embodiment of the invention for use with a grid computing system 200 of the type shown in FIG. 2, the process may be begun when the grid master 224 selects one or more client computers to perform a task and seeks to kick off the task. In a conventional system wherein all of the client computers would have been pre-configured to have access to the storage system 208 (FIG. 2), the grid master 224 need simply kick off the task and the client computers 210 selected to perform it can begin their specified operations. However, in accordance with one embodiment of the present invention, before client computers begin to perform data processing operations on data stored in the storage system 208, a dynamic configuration process can be performed to configure the storage system 208 to ensure that it provides each of the client computers selected by the grid master 224 with access to whatever resources (e.g., LUNs 218) in the storage system 208 the client computers 210 will need to perform the task. The process at FIG. 5 can be performed by any suitable computing device in the system. In accordance with one embodiment of the present invention, the process can be performed via a configuration agent 220 on the grid master 224. However, the invention is not limited in this respect, as the process such as that shown in FIG. 5 and the other techniques according to the embodiments of the invention described herein can be implemented on any suitable computer in a computer system.

When performed in connection with a grid computing system such as that shown in FIG. 2, the process 500 may start when a task (e.g., a grid job) is scheduled (e.g., by grid master 224) to be performed by a subset of the clients 210 in the grid. The subset of clients to perform the job may be selected by the grid master 224 using any suitable parameters for the job, as the aspects of the program mentioned and described herein are not limited in any respect by the manner in which the grid system operates. It should be appreciated that prior to the grid master seeking to initiate a grid job, all of the client computers selected to perform the job may have been previously physically connected to the storage system.

When a grid job is initiated, the process 500 may be called and, initially, at block 504, may determine whether there are sufficient visibility slots available for the storage system 208 to accommodate logging in and configuring each of the client computers 210 selected by the grid master 224 to perform the grid job. When it is determined at block 504 that there are not sufficient visibility slots available to accommodate all of the client computers 210 selected by the grid master to perform the grid job, the process proceeds to act 505, wherein an indication can be provided to the grid master 224 in any suitable manner that there are not sufficient slots available to accommodate all of the client computers 210 selected by the grid master to perform the grid job, and the process may then terminate. It should be appreciated that the indication can be provided to the grid master 224 in any suitable manner, as the aspects of the present invention described herein are not limited in this respect. In addition, the grid master 224 can respond to this information in any desired manner, as the aspects of the present invention described herein are not limited to any particular way in which a grid configuration can be implemented. For example, the grid master 224 could wait for a period of time and then resubmit the request in the hopes that additional visibility slots will be available. Alternatively, a capability can be provided that allows the rest of the system (e.g., via the configuration agent 220 or otherwise) to automatically notify the grid master 224 when the requested number of visibility slots become available. As a further alternative, the grid master 224 could re-configure the grid task and resubmit a request to perform the grid job using a smaller number of client computers 210.

When it is determined in block 504 that the requested number of visibility slots are available, the process proceeds to block 506, wherein each of the client computers 210 identified in the request is logged in to the storage system. As discussed above, this can be accomplished in any suitable manner, as the aspects of the present invention described herein are not limited to any particular implementation technique. In accordance with one embodiment of the present invention, the configuration agent 220 on the grid master 224 can issue a request to the NAS server 204 to log in each of the desired client computers 210, and use the capability of the NAS server 204 to log client computers in to the storage system 208. Of course, other alternatives are possible, including the process being initiated by an entity other than the configuration agent 220 (or the configuration agent being located on another component in the computer system rather than the grid master), and directly logging the client computers into the storage system 208 via direct communication with the storage system 208, rather than through the NAS server 204.

The process then proceeds to block 508, wherein the storage system is configured to allow each of the client computers 210 to access whatever storage resources are necessary to perform the grid job. In the illustrative system of FIG. 2, each of the client computers may be configured to access all of the LUNs 218 in the storage system 208, although it should be appreciated that the aspects of the present invention described herein are not limited in this respect, and that the client computers 210 could be configured to access only a subset of the LUNs 218 or other resources of the storage system 208. As with the logging in of the client computers, the configuring of the storage system 208 to provide access to the storage system resources can be performed in any suitable manner. In accordance with one embodiment, the configuration agent 220 on the grid master 224 can leverage the capabilities of the NAS server 204 to configure the storage system 208, although any of numerous implementation are possible, examples of which are described above in connection with the logging in of the client computers to the storage system 208.

The logging in of the client computers to the storage system 208 and the configuring of resources within the storage system 208 can be accomplished via the ports (not shown) of the storage system 208 in any suitable manner. Some examples of techniques for allocating the client computers 210 among the ports of the storage system 208 are described below, but it should be appreciated that those examples are merely illustrative, and that the aspects of the present invention described herein are not limited to any particular techniques in that regard.

After the client computers have been configured, the process proceeds to block 510 wherein the grid master 224 is notified that all of the client computers have been configured so that the grid master can kick off initiation of the grid job. Thereafter, the process proceeds to act 511 wherein it waits for notification that the task (or the grid job in the example described above) has been completed. This notification can be provided in any suitable manner, as the aspects of the present invention described herein are not limited in this respect. For example, when the grid job is completed, the grid master 224 can provide notification of its completion to the configuration agent 220, although numerous other implementation techniques are possible.

When it is determined in block 511 that the task has been completed, the process proceeds to block 512, wherein the storage system is re-configured to terminate access for at least some of the clients that performed the task. This can be performed by any entity in the computer system, including any of the entities described above for performing the logging in and configuration in blocks 506 and 508 (e.g., controlled by the configuration agent 220 utilizing the capabilities of the NAS server 204 or other components). It should be appreciated that the storage system can be re-configured in any suitable manner to ensure that one or more of the client computers does not consume a visibility slot of the storage system 208. As storage systems may differ in terms of what status of a client computer consumes a visibility slot (e.g., whether logged in and/or configured for access), so that the nature of the re-configuration to ensure that one or more of the client computers does not consume a visibility slot can be dependent upon the specific nature of the storage system.

In some embodiments, the storage system is re-configured to terminate access for all of the client computers that performed a task so that the client computers no longer consume a visibility slot when the task is completed, but it should be appreciated that the aspects of the present invention are not limited in this respect. For example, the storage system may be re-configured to terminate access for only a subset of the client computers that performed the task to no longer consume a visibility slot. In addition, rather than the completion of the task being the trigger for re-configuring the storage system, the trigger for that operation could alternatively be a request to perform a new task (e.g., a task that might otherwise be unable to be performed unless the storage system that has been previously configured for a client computer is reconfigured to no longer consume a visibility slot for the storage system so that it can be freed up for the new task).

In accordance with one embodiment of the present invention, the process that automatically logs in client computers and configures the storage system for the client computers to perform a task and access resources of the storage system and then automatically logs out the client computers and/or re-configures the storage system to no longer consume a visibility slot after the task has been completed can be performed by one or more scripts, but it should be appreciated that the aspects of the present invention are not limited in this respect and can be implemented in any suitable manner.

As discussed above, the logging in and configuring of the client computers can be performed in any suitable manner, as the aspects of the present invention described herein are not limited in any respect. In accordance with one embodiment of the present invention wherein the configuration employed the Celerra® MPFS as the NAS server 204 that also provides direct communication capabilities between the client computer 210 and the storage system 208 via a SAN connection 214, the NAS server 204 will handle the configuration of the LUNs 218 in the storage system 208 to provide access to each of the client computers 210, and the client computers 210 can each log in directly to the storage system 208 over the SAN connection 214. The client computers need not authenticate themselves to the storage system 208 as the configuration shown in FIG. 2 is a trusted environment wherein all of the client computers 210 are provided with access to all of the LUNs 218 on the storage system 208. However, as discussed above, this is merely one example of a configuration in which the aspects of the present invention can be employed, and numerous other configurations are possible.

As discussed above, the grid configuration of FIG. 2 is merely one example of a system in which the aspects of the present invention can be employed. Thus, the one or more client computers that share access to a resource in the storage system 208 need not be co-located or otherwise form part of a grid configuration. In addition, configuring the storage system for one or more client computers to perform a task and then re-configuring the storage system upon completion of the task for the client computers to no longer consume a visibility slot for the storage system can be performed in response to any suitable task, and it is not limited to the task being a grid.

As discussed above, the allocation of a plurality of client computers among the available ports of the storage system (e.g., over the SAN connection 214 in FIG. 2) can be accomplished in any suitable way, as the aspects of the present invention described herein are not limited in this respect. One example of a simple selection process will now be described in connection with FIGS. 6A-6E for an example in which five client computers are to be allocated among four ports for the storage system. This technique seeks to assign a next client computer to a port having the lowest number of client computers already logged in to it, and if there are multiple ports having the same lowest number of clients logged in to them, select the port with the lowest number. It should be appreciate that if the storage system has a configuration such as that shown in FIG. 4 wherein there are four ports for each storage processor, if it is desirable to provide a client computer with access to all of the LUNs of the storage system, each client computer will be logged in to at least one of the ports on each of the storage processors SPA 402 and SPB 404. In accordance with one embodiment of the present invention, the selection process can log in a client device to the same ports for each of the storage processors (only one of which is shown in FIGS. 6A-6E), but it should be appreciated that other selection techniques are possible, so that a client computer need not be logged in to the same port number on each of the storage processors.

Figure 6A:
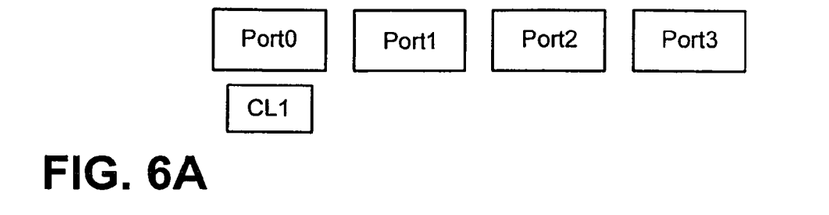
FIGS. 6A-6E and 7 are schematic diagrams illustrating assigning hosts to ports of a storage system according to some embodiments of the invention.

In FIG. 6A, a first client (Client1) may be logged in to the storage system via a first port (Port0). Port0 may be chosen because it is the lowest numbered port among those with the least number (zero) of clients logged in. Client1 may log in to the system and the system may be configured for the client to access the resources of the system available through that port.

Figure 6B:
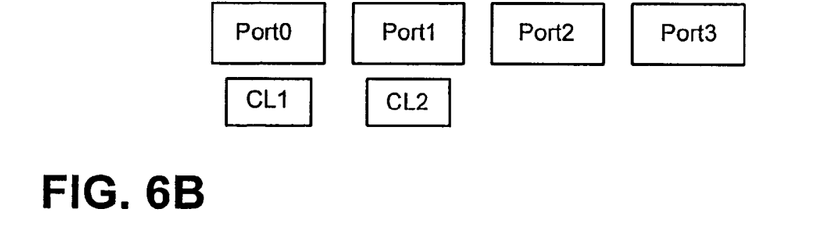
Figure 6C:
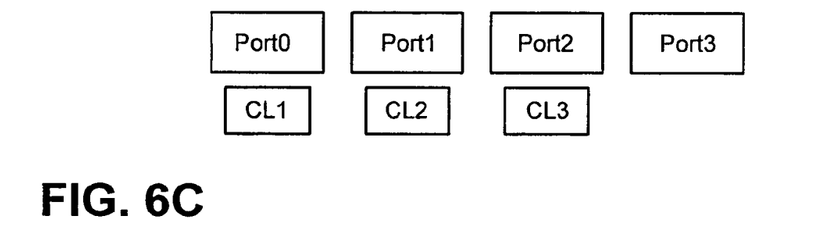
Figure 6D:
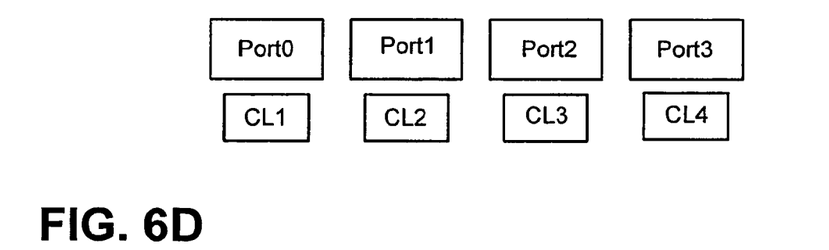
Figure 6E:
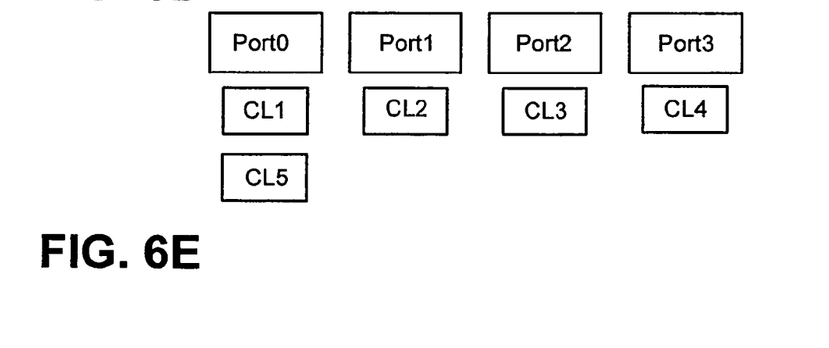

As shown in FIG. 6B, a second client (Client2) may access the storage system via a second port (Port1). Port1 may be chosen because it is the lowest numbered port among those with the least number of clients logged in at this point. Similarly, a third client (Client3) may be assigned to log in to the storage system via a third port (Port2) and a fourth client (Client4) may be assigned to a fourth port (Port3), as illustrated in FIGS. 6C and 6D, respectively, in much the same manner. When it comes time to allocate a fifth client (Client5), as all of the ports have been assigned a client device, Port0 is once again the lowest numbered port that shares the lowest number (now one) of clients logged in, so that Client5 may be assigned to Port1 as shown in FIG. 6E.

As indicated above, the technique illustrated in FIGS. 6A-6E is merely illustrative, as any suitable technique can be employed for allocating a desired number of client computers among the available ports of the storage system.

In accordance with an alternate embodiment of the present invention, a task (e.g., a grid job) may be presented along with a request that the computer system perform the task meeting one or quality of service requirements. For example, the grid master may assign a grid job to be performed by five client computers, and specify that the throughput for the client computers in accessing data from the storage system meet a specified quality of service parameter specified in any suitable manner (e.g., as a certain number of bytes per second). The configuration agent 220 (or any other component that allocates a plurality of client computers among the ports of a storage system to perform a task) can evaluate the requested quality of service parameters and determine whether they can be met using a subset of the ports of the storage system. For example, if the requested throughput for a task is no more than twice the throughput for accessing data through each of the ports of the storage system, then all of the client's very specific tasks can be dedicated to two of the ports of the storage system. For example, referring to the illustrative storage system in FIG. 6A, all of the client computers can be assigned to one of the ports of SPA 402 and to one of the ports of SPB 404. This is shown conceptually in FIG. 7, wherein all five clients may be assigned to Port0 on each of the storage processors. So long as no other clients are assigned to those ports during the operation of the task, the clients performed the task will have exclusive access in those ports, and can be ensured to meet the requested quality of service parameters. The system can then use each of the remaining ports of the storage system to service other tasks.

It should be appreciated that the specific throughput quality of service parameter provided above is merely illustrative, as other quality of service parameters can be evaluated in assigning client computers among the ports of a storage system. In addition, it should be appreciated that the embodiments of the present invention described herein are not limited to assigning host computers among the ports of a storage system using quality of service parameters, as any assignment technique may be employed.

Figure 7:
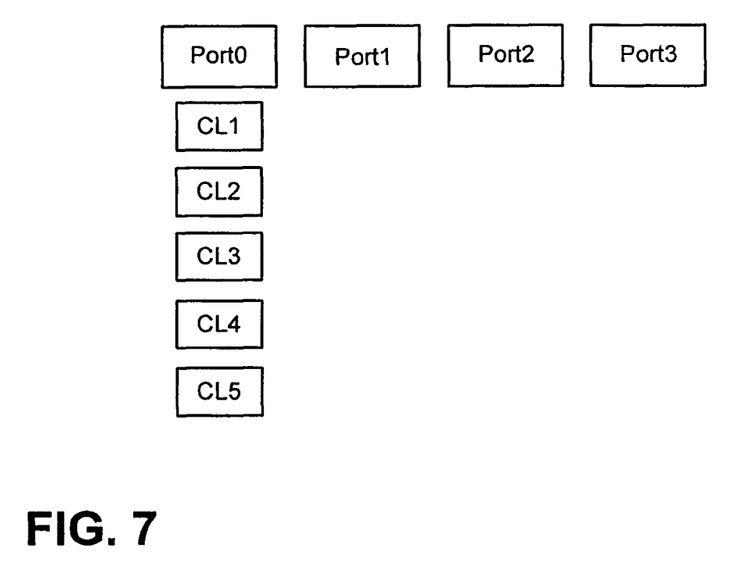

As discussed above, in some embodiments, a request issued to enable a subset of clients to access resources of the storage system to perform a task, may specify one or more quality of service parameters that are desired to be met by the storage system while performing the task. The storage system may then be configured to meet the quality of service parameters. The clients may be connected to ports of the storage system based on the desired quality of service parameters. For example, a throughput of the connection via a port may be used to assign clients to the ports, as shown in FIG. 7. Thus, when connections via all of the ports are not utilized, Client1 may be connected to Port1, as shown in FIG. 7. Further, Client2, Client3, Client4 and Client5 may connect to Port1 as well, based on the throughput that connections via Port1 may achieve. It should be appreciated, however, that embodiments of the invention are not limited to connecting clients to ports of the storage system as described in conjunction with FIGS. 6A-6E and 7 and may implement any suitable method.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, a tablet computer, etc.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions (including MicroCode) that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in a computer system comprising a plurality of client computers and at least one storage system, the method comprising:

receiving a first request for performance of a first task on the at least one storage system and a second request for performance of a second task on the at least one storage system;

scheduling, at a controller, subsets of the plurality of clients to access at least one resource of the at least one storage system in order to service the first request and the second request prior to performing the first task and the second task, respectively, of the first request and the second request, wherein the scheduling includes:

in response to the first request, the controller selecting a first subset of the plurality of clients to access the at least one resource of the at least one storage system to perform the first task, wherein the first subset of the plurality of clients includes more than one client; and in response to the second request, the controller selecting a second subset of the plurality of clients to access the at least one resource of the at least one storage system to perform the second task, wherein the second subset of the plurality of clients includes more than one client, wherein the first and second subsets are independently selected corresponding to requirements of the first and second tasks, and wherein the second subset of the plurality of clients cannot perform the second task simultaneously with the first subset of the plurality of clients performing the first task using the at least one storage system;

automatically configuring the at least one storage system to provide the first subset of the plurality of clients access to the at least one resource to perform the first task according to the scheduling by the controller;

after the first task is completed, automatically re-configuring the storage system so that at least one client of the first subset of the plurality of clients is no longer provided with access to the at least one resource according to the scheduling by the controller, wherein the at least one client of the first subset is not included in the second subset;

automatically configuring the at least one storage system to provide the second subset of the plurality of clients access to the at least one resource to perform the second task according to the scheduling by the controller.

2. The method of claim 1, wherein the controller comprises a grid controller, wherein the plurality of client computers comprise a grid, and wherein at least the first task comprises a grid job.

3. The method of claim 1, wherein the at least one resource comprises at least one logical volume of storage.

4. The method of claim 1,
wherein the controller comprises a grid controller;
wherein at least the first task comprises a grid job; and
wherein: (i) automatically configuring the at least one storage system to provide the first subset of the plurality of clients access to the at least one resource and (ii) automatically re-configuring the storage system so that the at least one client of the first subset of the plurality of clients no longer is provided with access to the at least one resource, are performed in response to at least one instruction received from the grid controller.

5. The method of claim 1, wherein the at least one storage system has a limit on a maximum number of clients that can be simultaneously configured to access the at least one resource.

6. The method of claim 1, wherein the first request specifies at least one quality of service parameter for the at least one storage system to meet in performing the first task; and wherein automatically configuring the at least one storage system to provide the first subset of the plurality of clients access to the at least one resource comprises configuring the at least one storage system to meet the at least one quality of service parameter.

7. The method of claim 1, wherein re-configuring the storage system so that the at least one client of the first subset of the plurality of clients no longer is provided with access to the at least one resource comprises, when the first task is completed, automatically re-configuring the storage system so that none of the first subset of the plurality of clients is provided with access to the at least one resource.

8. The method of claim 1, wherein the computer system further comprises at least one file system server that provides a file system interface for at least some information stored on the at least one storage system, the computer system further comprising at least first and second types of data paths extending between each of the plurality of client computers and the at least one storage system, the first type of data path passing through the at least one file system server so that at least one of the plurality of client computers exchanges information with the at least one storage system via the first type of data path using the file system interface, the second type of data path not passing through the at least one file system server so that at least one of the plurality of client computers exchanges information with the at least one storage system via the second type of data path using a storage system interface presented by the at least one storage system;

wherein automatically configuring the at least one storage system to provide the first subset of the plurality of clients access to the at least one resource is performed via the second type of data path; and wherein automatically re-configuring the storage system so that the at least one client of the first subset of the plurality of clients no longer is provided with access to the at least one resource is performed via the second type of data path.

9. The method of claim 8, wherein the computer system comprises a plurality of paths of the first type of data path and a plurality of paths of the second type of data path.

10. At least one non-transitory computer readable medium encoded with a plurality of instructions that, when executed, perform a method for use in a computer system comprising a plurality of client computers and at least one storage system, the method comprising:

receiving a first request for performance of a first task on the at least one storage system and a second request for performance of a second task on the at least one storage system;

scheduling, at a controller, subsets of the plurality of clients to access at least one resource of the at least one storage system in order to service the first request and the second request prior to performing the first task and the second task, respectively, of the first request and the second request, wherein the scheduling includes:
  in response to the first request, the controller selecting a first subset of the plurality of clients to access the at least one resource of the at least one storage system to perform the first task, wherein the first subset of the plurality of clients includes more than one client; and
  in response to the second request, the controller selecting a second subset of the plurality of clients to access the at least one resource of the at least one storage system to perform the second task, wherein the second subset of the plurality of clients includes more than one client wherein the first and second subsets are independently selected corresponding to requirements of the first and second tasks, and wherein the second subset of the plurality of clients cannot perform the second task simultaneously with the first subset of the plurality of clients performing the first task using the at least one storage system;

automatically configuring the at least one storage system to provide the first subset of the plurality of clients access to the at least one resource to perform the first task according to the scheduling by the controller;

after the first task is completed, automatically re-configuring the storage system so that at least one client of the first subset of the plurality of clients is no longer provided with access to the at least one resource according to the scheduling by the controller, wherein the at least one client of the first subset is not included in the second subset; and automatically configuring the at least one storage system to provide the second subset of the plurality of clients access to the at least one resource to perform the second task according to the scheduling by the controller.

11. The at least one non-transitory computer readable medium of claim 10, wherein the controller comprises a grid controller, wherein the plurality of client computers comprise a grid, and wherein at least the first task comprises a grid job.

12. The at least one non-transitory computer readable medium of claim 10, wherein the at least one resource comprises at least one logical volume of storage.

13. The at least one non-transitory computer readable medium of claim 10, wherein the computer system further comprises at least one file system server that provides a file system interface for at least some information stored on the at least one storage system, the computer system further comprising at least first and second types of data paths extending between each of the plurality of client computers and the at least one storage system, the first type of data path passing through the at least one file system server so that at least one of the plurality of client computers exchanges information with the at least one storage system via the first type of data path using the file system interface, the second type of data path not passing through the at least one file system server so that at least one of the plurality of client computers exchanges information with the at least one storage system via the second type of data path using a storage system interface presented by the at least one storage system;
wherein automatically configuring the at least one storage system to provide the first subset of the plurality of clients access to the at least one resource is performed via the second type of data path; and
wherein automatically re-configuring the storage system so that at least one client of the first subset of the plurality of clients no longer is provided with access to the at least one resource is performed via the second type of data path.

14. The at least one non-transitory computer readable medium of claim 10,
wherein the controller comprises a grid controller;
wherein the at least one task comprises a grid job; and
wherein: (i) automatically configuring the at least one storage system to provide the first subset of the plurality of clients access to the at least one resource and (ii) automatically re-configuring the storage system so that the at least one client of the first subset of the plurality of clients no longer is provided with access to the at least one resource are performed in response to at least one instruction received from the grid controller.

15. The at least one non-transitory computer readable medium of claim 10, wherein the at least one storage system has a limit on a maximum number of clients that can be simultaneously configured to access the at least one resource.

16. The at least one non-transitory computer readable medium of claim 10, wherein the first request specifies at least one quality of service parameter for the at least one storage system to meet in performing the first task; and
wherein automatically configuring the at least one storage system to provide the first subset of the plurality of clients access to the at least one resource comprises configuring the at least one storage system to meet the at least one quality of service parameter.

17. The at least one non-transitory computer readable medium of claim 10, wherein automatically re-configuring the storage system so that the at least one client of the first subset of the plurality of clients no longer is provided with access to the at least one resource comprises, when the task is completed, automatically re-configuring the storage system so that none of the first subset of the plurality of clients is provided with access to the at least one resource.

18. An apparatus for use in a computer system comprising a plurality of client computers and at least one storage system, the apparatus comprising:
at least one processor programmed to:
receive a first request for performance of a first task on the at least one storage system and a second request for performance of a second task on the at least one storage system;
schedule, at a controller, subsets of the plurality of clients to access at least one resource of the at least one storage system in order to service the first request and the second request prior to performing the first task and the second task, respectively, of the first request and the second request, wherein the scheduling includes:
in response to the first request, the controller selecting a first subset of the plurality of clients to access the at least one resource of the at least one storage system to perform the first task, wherein the first subset of the plurality of clients includes more than one client;
in response to the second request, the controller selecting a second subset of the plurality of clients to access the at least one resource of the at least one storage system to perform the second task, wherein the second subset of the plurality of clients includes more than one client, wherein the first and second subsets are independently selected corresponding to requirements of the first and second tasks, and wherein the second subset of the plurality of clients cannot perform the second task simultaneously with the first subset of the plurality of clients performing the first task using the at least one storage system;
automatically configure the at least one storage system to provide the first subset of the plurality of clients access to the at least one resource to perform the first task according to the scheduling by the controller;
after the first task is completed, automatically re-configure the storage system so that at least one client of the first subset of the plurality of clients is no longer provided with access to the at least one resource according to the scheduling by the controller, wherein the at least one client of the first subset is not included in the second subset; and
automatically configure the at least one storage system to provide the second subset of the plurality of clients access to the at least one resource to perform the second task according to the scheduling by the controller.

19. The apparatus of claim 18,
wherein the controller comprises a grid controller; and
wherein the computer system further comprises at least one file system server that provides a file system interface for at least some information stored on the at least one storage system, the computer system further comprising at least first and second types of data paths extending between each of the plurality of client computers and the at least one storage system, the first type of data path passing through the at least one file system server so that at least one of the plurality of client computers exchanges information with the at least one storage system via the first type of data path using the file system interface, the second type of data path not passing through the at least one file system server so that at least one of the plurality of client computers exchanges information with the at least one storage system via the second type of data path using a storage system interface presented by the at least one storage system;

wherein the at least one processor is programmed to automatically configure the at least one storage system to provide the first subset of the plurality of clients access to the at least one resource via the second type of data path in response to at least one instruction received from the grid controller; and wherein the at least one processor is programmed to automatically re-configure the storage system so that the at least one client of the first subset of the plurality of clients is no longer provided with access to the at least one resource via the second type of data path in response to at least one instruction received from the grid controller.

20. The apparatus of claim 18, wherein the at least one storage system has a limit on a maximum number of clients that can be simultaneously configured to access the at least one resource.

* * * * *